Aug. 25, 1964

R. G. SHELLEY 3,146,448

VEHICLE GUIDANCE SYSTEM

Filed Dec. 4, 1962

INVENTOR.
RULON G. SHELLEY

BY

*Edward A. Sokolski*

ATTORNEY

Aug. 25, 1964

R. G. SHELLEY 3,146,448

VEHICLE GUIDANCE SYSTEM

Filed Dec. 4, 1962

INVENTOR.
RULON G. SHELLEY

BY *Edward A. Sokolski*

ATTORNEY

INVENTOR.
RULON G. SHELLEY
BY Edward A. Sopelak
ATTORNEY

INVENTOR.
RULON G. SHELLEY

United States Patent Office 3,146,448
Patented Aug. 25, 1964

3,146,448
VEHICLE GUIDANCE SYSTEM
Rulon G. Shelley, Downey, Calif., assignor to
Tamar Electronics Industries, Inc.
Filed Dec. 4, 1962, Ser. No. 242,216
19 Claims. (Cl. 343—112)

This invention relates to a vehicle guidance system and more particularly to such a system in which the position of a vehicle is accurately ascertained by making a differential measurement of the angles subtended at the vehicle between a plurality of fixedly positioned beacon transmitters.

The device of this invention while it has general utility for the guidance of a vehicle such as an aircraft or a missile in flight, will be explained in this application for illustrative purposes as utilized for the control of an aircraft landing.

Most landing systems now in use such as the Instrument Landing System and GCA utilize elaborate ground based equipment which precisely determines the aircraft position and then proper information for the landing is relayed to the aircraft from the ground station. Such systems as GCA have a limited handling capacity in view of the fact that each individual aircraft must be contacted from the ground and the special information pertinent to the landing relayed thereto. In addition, there necessarily is some break in the information that the pilot receives as a continuous transmission of information from the ground to each aircraft is unfeasible. Further, fixed path systems such as the Instrument Landing System require that the pilot fly a predetermined fixed path, which may not be the best path for the particular aircraft and landing circumstances. With the Instrument Landing System, the plane can only be guided to the flare-out with the requirement that additional instrumentation usually located within the aircraft be used to take the aircraft to touch-down.

Systems of the prior art in which most of the approach and landing information is generated within the aircraft tend to be overly complicated and require the installation of a substantial amount of equipment within the aircraft. Such complicated equipment is difficult to maintain and generally suffers from low reliability.

The device of this invention overcomes the shortcomings of prior art systems such as the Instrument Landing System as well as those systems utilizing complicated airborne equipment by providing a highly accurate vehicle guidance system which is carried in the aircraft which is relatively simple and easy to maintain. The only equipments required on the ground are three CW transmitters spaced from each other on the runway in a predetermined positional relationship. The device of this invention is capable of locating the airport at a distance of 30–100 miles and providing steering guidance for the glide path. Coupled with an appropriate flare out computer, it can provide accurate guidance information to touch-down and even on the runway after touchdown.

As contrasted with other systems, in the device of this invention, the pilot has his own internally generated information on the exact range to touchdown at all times without having to depend upon receiving information from the ground. In addition, the pilot need not rely upon a predetermined glide slope path such as is the case in the Instrument Landing System but can select his own guide slope angle to meet his particular requirements, with the system providing all the necessary steering information to effect the landing with the selected glide slope. The system of this invention further utilizes a heading error signal rather than a signal for a return to a fixed path such as the Instrument Landing System. This enables the utilization of display quickening which tends to prevent overshoot on returning to the desired glide slope path on deviation therefrom. This system further is capable of providing roll and pitch information in addition to the normal steering guidance signals.

The device of this invention achieves this improvement by utilizing a differential direction finder which may comprise a radio receiver system in the aircraft operating in conjunction with at least three CW radio beacon transmitters located in a predetermined positional relationship on the ground. The transmission frequencies of the beacon transmitters are separated from each other by predetermined different frequencies. The radio receiving system does not utilize a local oscillator but rather the CW signals received from the beacon transmitters are mixed together in a mixer circuit with the beat frequencies between these received signals appearing in the output of the mixer at an intermediate frequency. The antenna of the receiving system is caused to scan in azimuth and elevation in a predetermined pattern and at a predetermined rate.

The receiving system may, for example, be of the type utilized in a monopulse radar system. As is well known in the art, in a monopulse type radar system utilizing sum and difference channels, when the boresight of the antenna is pointed at a target, no signal is fed from the microwave bridge system to the difference channel. When the boresight of the antenna is on one side of the target in either azimuth or elevation, a signal of one phase relationship with the signal in the sum channel is produced. When the boresight of the antenna is on the opposite side of the target in either azimuth or elevation, a signal of opposite phase relationship with respect to the signal in the sum channel is produced. Thereby, the deviation of a target from the boresight of the antenna can be ascertained.

This principle is utilized in the device of the invention to accurately determine the angle subtended by the beacon transmitters at the vehicle in both azimuth and elevation. With the information as to the precise predetermined relative distances between the beacons, range information as well as angle information can also be ascertained to enable the exact determination of the aircraft position at all times.

Such information is derived by virtue of the fact that each time the antenna passes through the azimuth bearing of one of the beacons, the azimuth component of the signal received therefrom appearing in the difference channel will go to zero. So also, the beat frequency produced in the mixer between this signal and a signal from one of the other beacons will, of necessity also go to zero. The same occurs for the elevation component of the difference channel signal received from a particular beacon when the antenna passes through this beacon's elevation angle relative to the aircraft. While the antenna is scanning between two beacons in either azimuth or elevation, the signal outputs in the difference channel for the azimuth and elevation components will have one particular phase relationship with the signal in the sum channel, and there will be signal phase reversal in the difference channel as the antenna scans past either of these beacons.

Phase sensitive detectors are connected to ascertain the phase relationship between the signals in the difference channel and the sum channel, the outputs of the phase sensitive detectors for azimuth and elevation reversing polarity each time the antenna boresight passes through one of the beacons in either azimuth or elevation respectively.

Means are provided to convert the outputs of the phase detectors to square waves having pulse widths which are a function of the portion of the antenna scan cycle it takes for the azimuth or elevation boresight of the antenna as the case may be to travel between the beacons. The widths of these square waves are directly proportional to the angle subtended at the aircraft by the beacons in azimuth and elevation. With such information, for three beacons along with information as to the precise relative distances between these beacons, as will subsequently be shown, the precise position of the aircraft can be ascertained.

While the device of the invention has been described for illustrative purposes in connection with a monopulse type radar receiver operating at microwave frequencies, the principles involved can be utilized to equal advantage in conjunction with other types of radio direction finders operating in other radio frequency ranges.

In view of the fact that difference information is utilized in the device of the invention, the accuracy of the individual signals themselves is not critical. Errors due to such factors as atmospheric refraction, boresight errors, antenna pattern errors, bias errors, temperature drifts, and internal misalignments in the system are substantially cancelled out in the subtraction process inherent in a differential measurement.

It is therefore an object of this invention to provide an improved vehicle guidance system.

It is a further object of this invention to provide a vehicle guidance system suitable for effecting a landing in which the necessary information is generated within the aircraft.

It is still a further object of this invention to provide an aircraft landing system which provides information for approach to an airfield, entry into a glide path, and flare out to touchdown.

It is still another object of this invention to provide a highly accurate vehicle guidance system which is of relatively simple design.

It is a still further object of this invention to provide an aircraft guidance system capable of high accuracy which utilizes a minimum amount of equipment both on the ground and in the aircraft.

Other objects of this invention will become apparent from the following description taken in connection with the accompanying drawings of which FIGS. 1 and 2 are diagrams illustrating the angular computations involved in the device of the invention;

Figure 1:
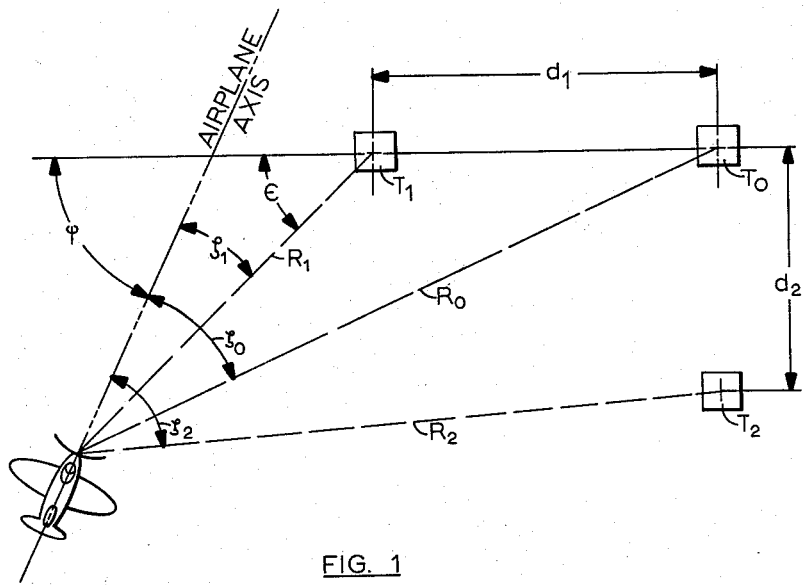
Figure 2:
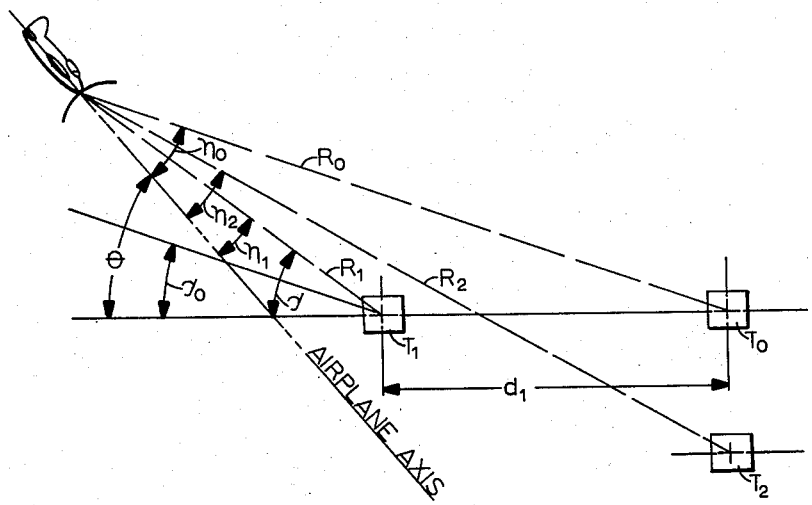

Referring now to FIGS. 1 and 2, the angular computations involved in the device of the invention are illustrated. FIG. 1 is a plan view illustrating the azimuth angles involved while FIG. 2 is an elevation view illustrating the elevation angles. Three CW transmitters $T_1$, $T_0$ and $T_2$ are located on a landing strip with $T_1$ being separated from $T_0$ by a distance $d_1$ and $T_0$ being separated from $T_2$ by a distance $d_2$. The ratio of $d_1$ to $d_2$, i.e., the relative distances between the beacons is a predetermined quantity for all airports which may, for example, be about .15. The beacon transmitters may, for example, be located beneath the ground or remotely, with the antenna being near the runway surface.

For small angles which are the type which would be generally involved in a runway approach, $$\sin \zeta_2 - \zeta_0 \simeq \frac{d_2}{d_1 + R_1} \quad (1)$$

and $$\sin \zeta_2 - \zeta_0 \simeq \zeta_2 - \zeta_0 \simeq \frac{d_2}{R_0} \quad (2)$$

$$R_0 \simeq R_1 + d_1 \quad (3)$$

therefore, $$R_1 \simeq \frac{d_2}{\zeta_2 - \zeta_0} - d_1 \quad (4)$$

Thus, for small angles, the range $R_1$ to $T_1$, which is utilized as the touchdown point, is ascertainable in terms of the distances between the beacon transmitter and the angle subtended between targets $T_0$ and $T_2$.

Referring to FIG. 2, if $\gamma_0$ is the desired glide slope angle which is indicated later on in the specification can be set in by the pilot and $\gamma$ is the actual glide slope angle being flown by the plane, then the elevation steering error is $\gamma - \gamma_0$ which is derived in terms of the various angular measurements as follows:

$$\sin \gamma = \sin 180° - \gamma \quad (5)$$

therefore by the law of sines, $$\frac{\sin \gamma}{R_0} = \frac{\sin (\eta_0 - \eta_1)}{d_1} \quad (6)$$

and, for small angles, $$\gamma \simeq \frac{R_0}{d_1}(\eta_0 - \eta_1) \quad (7)$$

$$\gamma - \gamma_0 \simeq \frac{R_0}{d_1}(\eta_0 - \eta_1) - \gamma_0 \quad (8)$$

from (2), $$R_0 \simeq \frac{d_2}{(\zeta_2 - \zeta_0)} \quad (9)$$

and substituting for the value of $R_0$ per (9) in (8)

$$\gamma - \gamma_0 \simeq \frac{d_2(\eta_0 - \eta_1)}{d_1(\zeta_2 - \zeta_0)} - \gamma_0 \simeq \frac{\frac{d_2}{d_1}(\eta_0 - \eta_1) - \gamma_0(\zeta_2 - \zeta_0)}{(\zeta_2 - \zeta_0)} \quad (10)$$

Thus, it can be seen that the elevation steering error can be described in terms of the angles subtended between a pair of the beacons in elevation and a pair of the beacons in azimuth.

The azimuth steering error $\epsilon$ is computed as follows:

$$\sin 180° - \epsilon = \sin \epsilon \quad (11)$$

By the law of sines (FIG. 1), $$\frac{\sin \epsilon}{R_0} = \frac{\sin (\zeta_0 - \zeta_1)}{d_1} \quad (12)$$

And for small angles $$\frac{\epsilon}{R_0} \simeq \frac{(\zeta_0 - \zeta_1)}{d_1} \quad (13)$$

Substituting for $R_0$ from (5), $$\epsilon \simeq \frac{(\zeta_0 - \zeta_1)d_2}{(\zeta_2 - \zeta_0)d_1} \quad (14)$$

To the value of $\epsilon$ computed in Formula 14 must be added a correction in accordance with the roll attitude, $\phi$ of the aircraft. It is assumed for the purposes of computation that the aircraft is on the desired glide path in adding this approximate correction, therefore the azimuth steering error becomes $$\epsilon \simeq \frac{(\zeta_0 - \zeta_1)d_2}{(\zeta_2 - \zeta_0)d_1} + \gamma_0\phi \simeq \frac{(\zeta_0 - \zeta_1)\frac{d_2}{d_1} + \gamma_0(\eta_2 - \eta_0)}{(\zeta_2 - \zeta_0)} \quad (15)$$

It also can be shown that roll attitude $\phi$, pitch attitude $\theta$ and yaw attitude $\psi$ can be determined in terms of the various angles as follows:

$$\phi = \frac{\eta_2 - \eta_0}{\zeta_2 - \zeta_0} \quad (16)$$

$$\theta = \gamma - \eta_1 \quad (17)$$

$$\psi = -(\epsilon + \zeta_1) \quad (18)$$

The angles subtended at the vehicle between the various beacon transmitters is determined by means of a differential direction finder which may comprise a monopulse radar receiver. As is known in the art, a monopulse radar receiver having sum and difference channels and at least a pair of antenna elements producing beams spacially separated in azimuth and squinted with respect to each other in elevation will have signal components in its difference channel which go to zero when the azimuth or elevation boresights of the antenna are pointed at a particular target. The resultant signal obtained in the difference channel can be resolved into azimuth and elevation components which are in quadrature relationship with each other. Each of these components varies in amplitude and phase relationship with the signal in the sum channel in accordance with the positional relationship of the antenna boresight with respect to the target.

Figure 3:
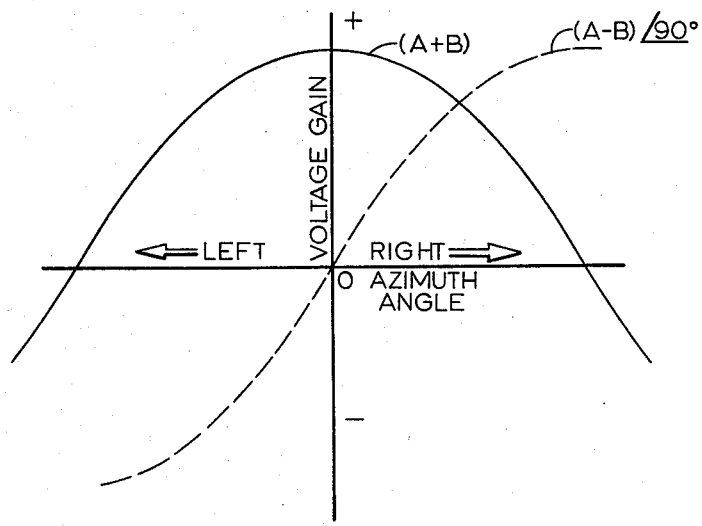
FIGS. 3 and 4 illustrate the antenna patterns of a typical monopulse radar system.
Figure 4:
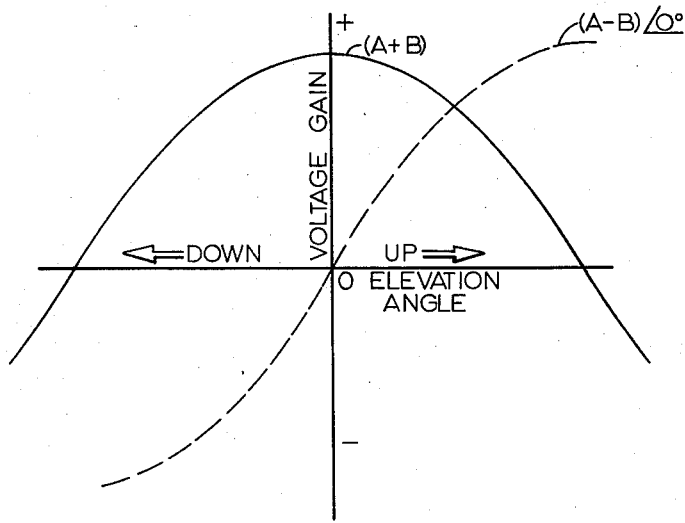

This relationship is indicated for variations in azimuth angle with respect to the target in FIG. 3 and for variations in elevation angle with respect to the target in FIG. 4. Thus, as indicated in FIG. 3 when the target is to the right of the antenna boresight the azimuth component of the difference signal is in phase with the sum signal and of an amplitude which is in accordance with the magnitude of this deviation. When the target is to the left of the boresight the azimuth difference signal is 180 degrees out of phase with the sum signal and again of a magnitude in accordance with the amount of deviation. As indicated in FIG. 4, when the target is above the boresight, the elevation component of the difference signal is in phase with the sum signal while when the target is below the antenna boresight the elevation component of the difference signal is 180 degrees out of phase with the sum signal.

The details of such monopulse operation are explained in "Introduction of Monopulse," by Donald R. Rhodes, published in 1959 by McGraw-Hill. Such a monopulse signal can be derived with a two element antenna having beams squinted in elevation and spacially separated in azimuh as indicated on pages 74 and 75 of the aforementioned book by Rhodes. A particular two beam antenna system designed in accordance with these principles is described in Patent No. 3,014,214 entitled "Conical Scan Monopulse Radar System," R. N. Ashby et al., issued December 1961. No conical scanning mechanism, however, as described in the Ashby patent is necessary for use with the device of this invention.

Figure 5:
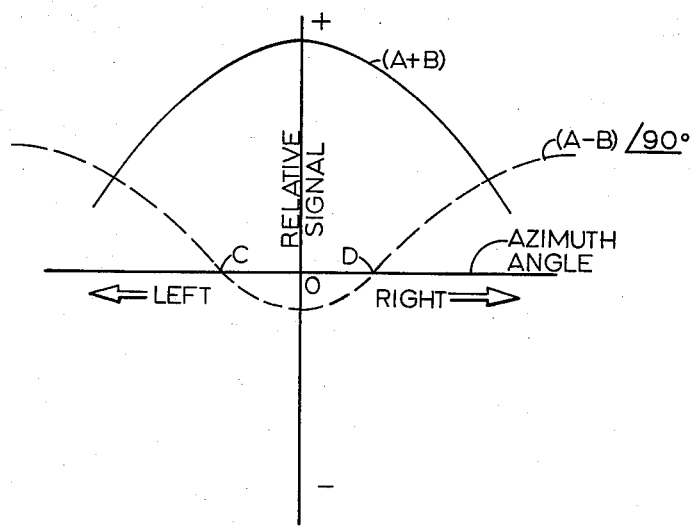
FIGS. 5 and 6 illustrate typical antenna patterns of an antenna which may be utilized in the device of the invention.
Figure 6:
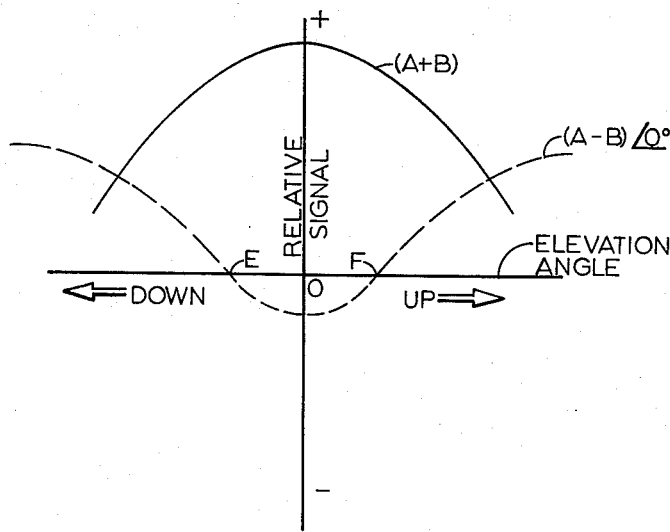

Now, let us consider the effect of receiving signals in a monopulse receiver simultaneously from two different CW sources, these signals differing by a small frequency. A "beat" frequency signal will occur in both the sum and difference channels of the monopulse receiver. The relative phases and amplitudes of these sum and difference signals will be a function of azimuth and elevation as indicated in FIGS. 5 and 6. It is to be noted that each time the antenna azimuth or elevation boresight is trained on one or the other of the sources as indicated at points C, D, E, and F, that the signal from such source representing either the azimuth or elevation component goes to zero. Therefore, there can be no beat frequency signal resulting from this component and the beat frequency difference channel signal likewise goes to zero. Thus, we will obtain a zero azimuth or elevation difference channel component each time the antenna is pointed at a beacon transmitter in either azimuth or elevation.

It is also to be noted that there is a phase reversal of the azimuth and elevation component of the difference signal when the antenna passes through a beacon in azimuth and elevation respectively. The portion of the antenna scan cycle between these null points is proportional to the angular separation of the sources in either azimuth or elevation. Since the null can be made very sharp and well defined, the angular separation between the two nulls can be measured quite accurately. In view of the differential type measurement which is utilized, the system is not sensitive over wide limits to signal amplitude errors, or other such error producing effects.

In the device of this invention, the antenna is scanned in a one bar pattern at a regular repetitive rate. The plane of the scan being inclined so that there is both an azimuth and elevation component. Each time the antenna in its scanning passes through the azimuth or elevation angle at which a beacon transmitter is located, zero output signal at the beat frequency obtained by virtue of this particular beacon signal will result. If the rate of scanning is closely controlled, the interval between the nulls obtained for both the azimuth and elevation components of the signals in the difference channel can be accurately determined.

It is to be noted that the signals have one phase relationship with the sum signals between nulls which reverses on passing through the nulls.

This information can be utilized to percisely determine the angle of the separation between the beacons both in azimuth and elevation. If three or more targets are utilized, the angle of the separation between any pair of targets can be similarly determined provided that the difference frequencies are chosen so that they will not interfere with each other and can be separated. The difference frequencies should be selected so that they have a non harmonic relationship to avoid the generation of spurious frequencies which might produce undesirable interference.

Figure 7:
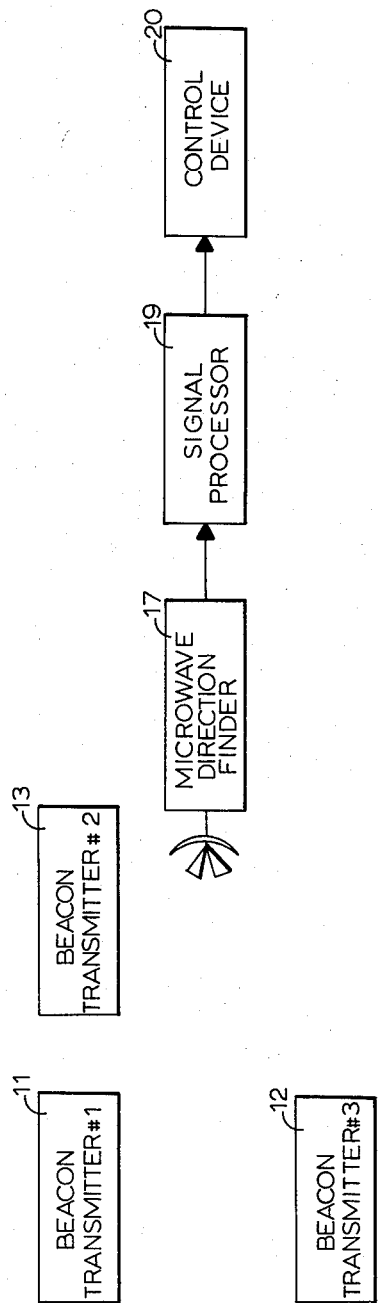
FIG. 7 is a block diagram illustrating the basic operation of the device of the invention.

Referring now to FIG. 7, a block diagram illustrating the basic elements of the device of the invention is shown. Beacon transmitters 11, 12, and 13 are located on the ground, for example on an aircraft runway and separated from each other by predetermined relative distances. These beacon transmitters are capable of transmitting CW microwave signals. Their transmission frequencies are separated from each other by predetermined separate frequencies which as already indicated should not produce interfering harmonics. These frequencies should be within the normal radar intermediate frequency range. Typical beacon frequencies might, for example, be between 9,000–10,000 megacycles, the frequency of beacon transmitter #2 being 13,000 kilocycles above that of transmitter #1 and the frequency of transmitter #3 being 33,0000 kilocycles above the frequency of transmitter #1. Thus, if transmitter #1 be designated $T_0$ as shown in FIGS. 1 and 2 and transmitters #2 and #3 be designated transmitter $T_1$ and $T_2$ respectively, difference frequencies will be produced by virtue of the beating between the outputs of transmitter #2 and transmitter #1 and transmitter #3 and transmitter #1 of 13,000 kilocycles and 33,000 kilocycles respectively.

For the purposes of later discussion, the 13,000 kilocycle signal will be designated $\omega_1$ and the 33,000 kilocycle signal will be designated $\omega_2$. The output signals from the three beacon transmitters are received by microwave direction finder 17 which may comprise a monopulse radar receiver with a directive antenna having a pair of beams spacially separated in azimuth and squinted in elevation. Microwave direction finder 17 produces output signals indicative of the angular separation between beacons 2 and 1 and 3 and 1 in both azimuth and elevation. This information is fed from the direction finder to signal processor 19. Signal processor 19 generates steering signals which provide corrections which must be made to the vehicle's course to attain the desired end result. The outputs of signal processor 19 are fed to control device 20 where they are properly utilized. Control device 20 may be an indicator such as an oscilloscope presenting steering information to the pilot, or may comprise an autopilot which automatically flies the aircraft in accordance with the signals received.

Figure 8:
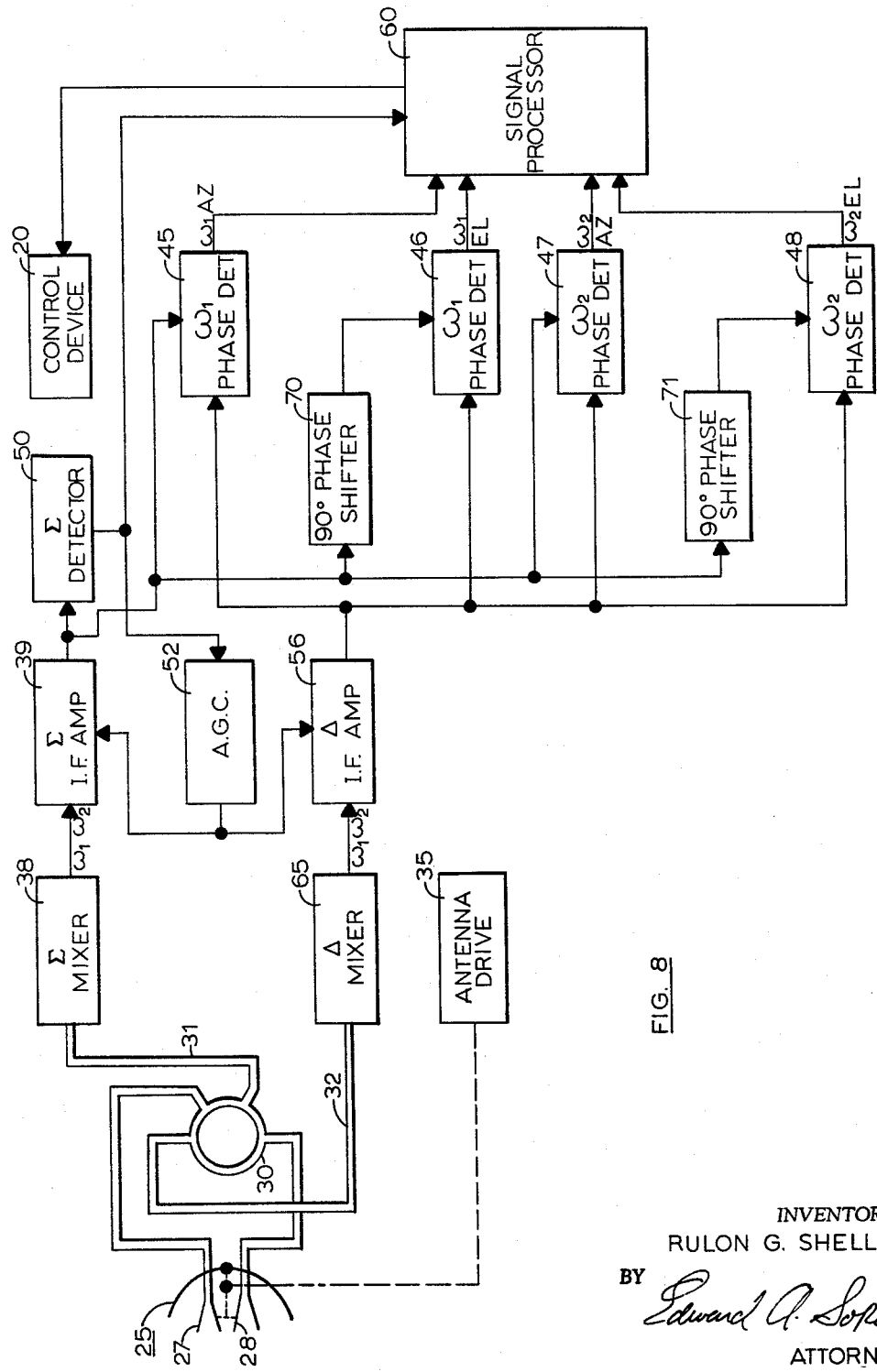
FIG. 8 is a functional block diagram of a preferred embodiment of the device of the invention.

Referring now to FIG. 8, a preferred embodiment of the device of the invention is shown. Microwave signals are received by two element microwave antenna 25. This antenna as already noted includes two horn elements 27 and 28 which are spacially separated in azimuth and squinted in elevation.

The signals received from the beacon transmitters by horn elements 27 and 28 are fed to a hybrid bridge or "rat race" 30. The signals from elements 27 and 28 are fed to hybrid bridge 30 in such a manner and the bridge is so constructed to produce a summation of these two signals at the input to wave guide element 31 and a subtraction of these two signals at wave guide element 32. This is achieved, as is well known in the art, by making the legs of the bridge of appropriate lengths as related to the nominal frequencies of the input signals.

The antenna 25 is scanned in an appropriate one bar pattern by means of antenna drive 35. As already indicated, this scan should have both azimuth and elevation components and might for example, be inclined so that its plane is at about a 20 degree angle where the device of the invention is utilized for a landing system. The signals appearing in waveguide 31 are fed to Sum Mixer 38. Mixer 38 may be a conventional microwave mixer utilizing a crystal diode. It is to be noted that no local oscillator is necessary in the device of the invention, the difference or IF frequency being produced by virtue of the beating between the beacon transmitter signals. The output signals $\omega_1$ and $\omega_2$ from sum mixer 38 are fed to Sum IF Amplifier 39 where they are appropriately amplified. The output of Sum Amplifier 39 is utilized as the reference signal for phase detectors 45–48.

The output of the Sum IF Amplifier is also rectified in Sum Detector 50 and utilized for automatic gain control which is developed in AGC Circuits 52. The output of AGC Circuits 52 is fed to both Sum IF Amplifier 39 and Difference IF Amplifier 56. While signal strength does not affect accuracy over wide limits, a simple AGC function is provided to prevent saturation of the circuits at short ranges. The output of Sum Detector 50 is also utilized as a signal strength gate signal which is fed to signal processor 60, and as to be explained in connection with FIG. 9 assures that an undesired signal emanating from the sum channel side lobes does not produce an anomalous output.

The difference signal produced in the output of hybrid bridge 30 is fed through Wave Guide 32 to Difference Mixer 65, where the beat frequency signals $\omega_1$ and $\omega_2$ appearing in the Difference Channel are derived. These signals are fed to Difference IF Amplifier 56. The signals are appropriately amplified in IF Amplifier 56 and fed as input signals to phase detector 45–48. These phase detectors may be conventional phase comparators such as that shown on page 52 of the aforementioned Rhodes reference. Phase detectors 45 and 46 have their inputs tuned to one of the beat frequencies, $\omega_1$, while phase detectors 47 and 48 have their inputs tuned to the other of the desired beat frequencies, $\omega_2$. Reference signals for each of the phase detectors is supplied from the output of Sum IF Amplifier 39. The reference signals for two of these phase detectors 46 and 48 are phase shifted by means of 90 degree phase shifters 70 and 71 respectively. This makes phase detectors 46 and 48 sensitive to elevation components of the signals while phase detectors 45 and 47 are sensitive to azimuth components. As already noted these components are in quadrature relationship with each other and thus can readily be extracted by shifting the reference for the elevation detectors by 90 degrees.

Each of phase detectors 45–48 has a D.C. output signal which has a polarity which depends upon the phase relationship between the input and reference signals fed thereto. When the antenna 25 is trained on a beacon transmitter in either azimuth or elevation an associated phase detector will have zero output. This output will reverse polarity each time the antenna passes through this beacon in either azimuth or elevation as the case may be. The outputs of the phase detectors are fed to signal processor 60.

Figure 9:
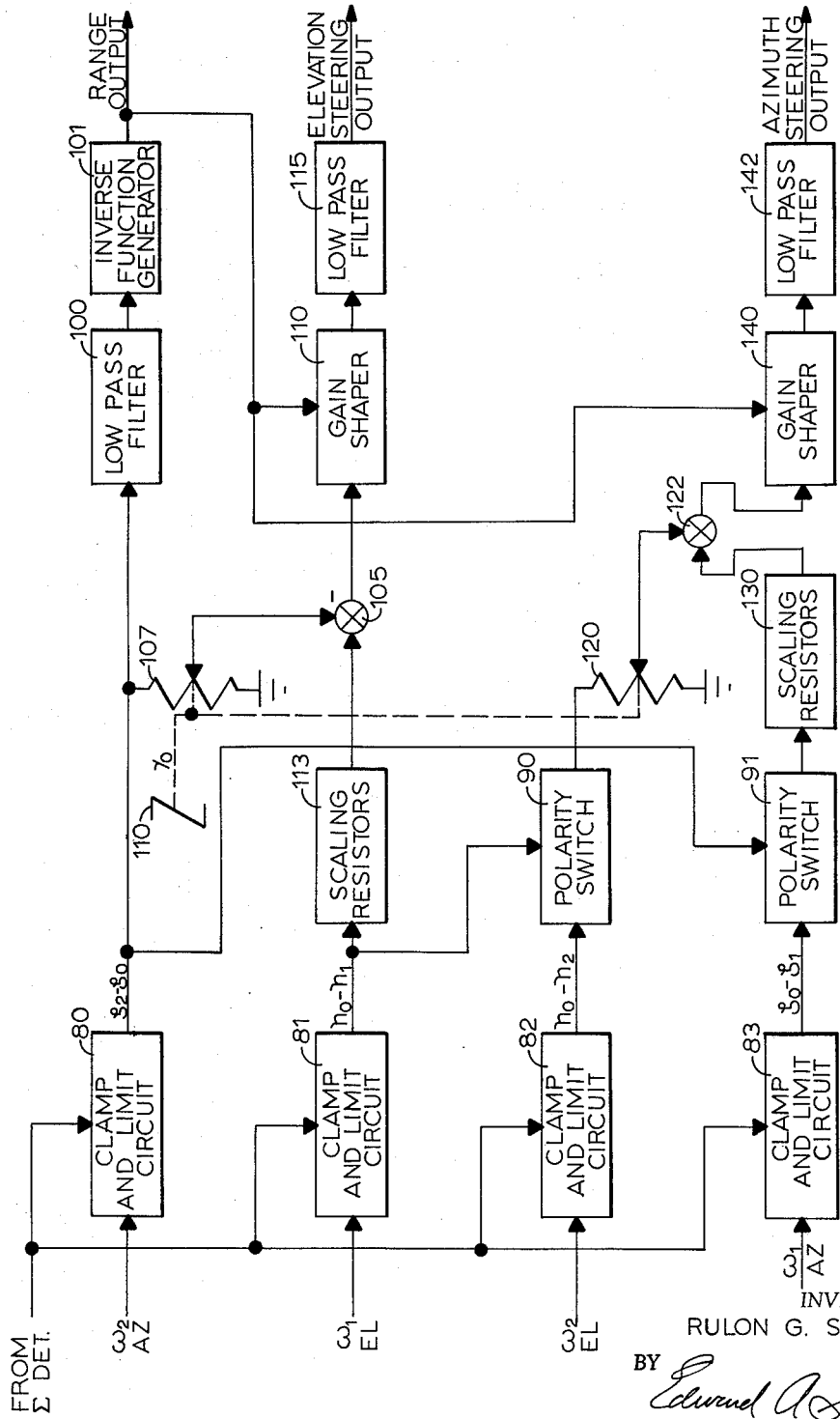
FIG. 9 is a block diagram of a signal processor which may be utilized in the device of the invention.

Referring now to FIG. 9, a Signal Processor which may be utilized with the device of this invention is illustrated. The output of each of phase detectors 45–48 representing an azimuth or elevation component of $\omega_1$ or $\omega_2$ is fed to a separate clamp and limit circuit 80–83. The output of Sum Detector 50 is also fed to each one of these clamp and limit circuits. Each of clamp and limit circuits 80 is designed to produce an output signal only when there is a predetermined minimum input arriving both from the sum detector and the associated phase detector connected thereto. These clamp and limit circuits may comprise simple "AND" gates utilizing diodes such as described on page 32 of "Arithmetic Operations and Digital Computers" by R. K. Richards published by The Van Nostrand Co.

These circuits should be designed, for example, so that when there is a signal arriving at the input thereof of a predetermined minimum amplitude simultaneously with a signal from an associated phase detector of a predetermined polarity, then the circuit will have a predetermined output. When both these conditions are not satisfied, no output is obtained.

By reference to FIGS. 5 and 6, it can be seen that the phase detector outputs have one polarity when the antenna is between two beacon transmitters and reverse polarity as the antenna passes through a beacon in either azimuth or elevation. Thus, the time duration or width of the square wave output of each of clamp and limit circuits 80–83 will be indicative of a separate one of the azimuth or elevation angles subtended between a pair of beacon transmitters.

During a normal approach $(\zeta_2-\zeta_0)$ and $(\eta_1-\eta_0)$ can be of only one polarity. However, $(\zeta_1-\zeta_0)$ and $(\eta_2-\eta_0)$ can be either positive or negative. Polarity switches 90 and 91 are utilized to assure that the actual angular relationship is sensed. If there are simultaneous outputs from both clamp and limit circuits 81 and 82, geometry dictates that the angular differences must be of the same polarity. If there are no such simultaneous outputs, then these two difference angles must be of opposite polarity. Polarity switch 90 which may include an AND gate which drives a one shot multivibrator has one of two outputs depending upon the polarity relationship of the inputs fed thereto. Polarity switch 91 operates similarly to switch 90 in conjunction with the signals received from clamp and limit circuits 80–83. It is to be noted that the outputs of clamp and limit circuits 80–83 are maintained at a predetermined magnitude in accordance with clamping techniques well known in the art.

The output of clamp and limit circuit 80 is fed to lowpass filter 100 which integrates the signal and effectively filters out A.C. components, and the resultant D.C. signal is a function of the range to beacon transmitter $T_1$ (see FIG. 1 and Equation 4). It is to be noted that the quantities $d_1$ and $d_2$ of Equation 4 are constant and are therefore readily scaled into the range output signal from lowpass filter 100 by techniques well known in the art. The output of filter 100 is fed to inverse function generator 101 where a signal in accordance with $$\frac{1}{\zeta_2-\zeta_0}$$

is developed. An inverse function generator which may be used is described, for example, on page 340 of "Electronic Analog Computers," by Korn and Korn, published by McGraw-Hill.

The output of clamp and limit circuit 81 which is in accordance with $(\eta_0-\eta_1)$ is fed to scaling resistors 113 where it is effectively multiplied by a quantity in accordance with $d_2/d_1$ (FIG. 1) and thence to summing device 105. The output of potentiometer 107 is subtracted from the output of clamp and limit circuit 81 in summing device 105.

The arm of potentiometer 107 is set by the pilot by means of knob 110, this setting being indicative of desired glide slope angle $\gamma_0$. The output of summing device 105 is fed to gain shaper 110 where the output of summing device 105 is effectively multiplied by this signal received from inverse function generator 101. The output of gain shaper 110 is integrated and filtered in low-pass filter 115 to produce a D.C. signal.

The output of polarity switch 90 is fed to potentiometer 120 where it is effectively multiplied by the $\gamma_0$ setting of knob 110. The signal at the arm of potentiometer 120 is added to the output of polarity switch 91 in summing device 122. The output of polarity switch 91 is multiplied by $d_2/d_1$ (FIG. 1) in scaling resistors 130 prior to being fed to summing device 122. The output of summing device 122 is fed to gain shaper 140 where a multiplication by the output of inverse function generator 101 is achieved. The output of gain shaper 140 is fed to low-pass filter 142 which integrates the signal and filters out A.C. components therefrom to produce a D.C. azimuth steering output which is in accordance with Equation 15.

The outputs of inverse function generator 101 and low-pass filters 115 and 142 which represent the range, elevation error, and azimuth error signals are fed to a control device which may comprise an indicator which the pilot utilizes to fly the aircraft to maintain minimal error signals or an auto-pilot which automatically controls the aircraft to zero out the error signals.

The device of the invention thus provides a simple yet highly effective device for providing vehicle guidance information suitable for utilization in controlling the landing of an aircraft. High accuracy is obtained by utilizing a differential measurement so that there are no critical absolute quantities of measurement involved.

While the invention has been described and illustrated in detail, it is to be clearly understood that this is intended by way of illustration in example only and not by way of limitation, the spirit and scope of the invention being limited only by the terms of the following claims.

I claim:
1. In a vehicle guidance system,
   a plurality of beacon transmitters having different transmission frequencies fixedly located in a predetermined relative positional relationship,
   direction finding means mounted in said vehicle for detecting the beat signals produced between said transmitter outputs and generating output signals in accordance therewith having time durations in accordance with the angles subtended at said vehicle between said beacon transmitters, and
   signal processor means mounted in said vehicle and responsively connected to the output of said direction finding means for generating signals in accordance with the range to one of said transmitters and vehicle azimuth and elevation steering information.

2. The system as recited in claim 1 wherein said direction finding means includes an antenna system having at least a pair of elements separated in azimuth and elevation, means for causing said antenna to scan in azimuth and elevation, and a monopulse receiving system having sum and difference channels connected to receive the output of said antenna system.

3. The system as recited in claim 2 wherein said receiving system includes separate phase detector means having the outputs of said sum and difference channels fed thereto and tuned to preselected ones of said beat signal frequencies for producing output signals of a polarity in accordance with the phase relationship between the sum and difference signals fed thereto at the particular tuned frequency thereof.

4. The system as recited in claim 3 wherein said signal processor means includes means for converting the outputs of said phase detector means to square waves having pulse widths in accordance with the angles subtended between said transmitters.

5. In a vehicle guidance system,
   a plurality of beacon transmitters fixedly located in a predetermined relative positional relationship, the transmission frequencies of said beacon transmitters being separated from each other by predetermined different frequencies,
   direction finding means mounted in said vehicle for detecting the beat signals produced between said transmitter outputs at said predetermined frequencies and generating output signals in accordance with the angles subtended at said vehicle between said beacon transmitters, and
   signal processor means mounted in said vehicle and responsively connected to the output of said direction finding means for generating signals in accordance with the range to one of said transmitters and vehicle azimuth and elevation steering information.

6. The system as recited in claim 5 wherein said direction finding means includes a monopulse receiving system having sum and difference channels and separate phase detector means for detecting the phase relationships at each of said predetermined frequencies between the output signals of said sum channel and the azimuth and elevation components of the output signals of said difference channel.

7. The system as recited in claim 6 wherein said signal processor means includes AND gate means connected to receive the output of each of said phase detector means and the output of said sum channel for generating an output having a predetermined amplitude when the outputs of said sum channel and the associated phase detector are of a predetermined polarity and minimum amplitude.

8. In a vehicle guidance system,
   at least three radio beacon transmitters located in a predetermined relative positional relationship, the transmission frequencies of said transmitters being separated from each other by predetermined separate frequencies, and
   a monopulse receiving system mounted in said vehicle having sum and difference channels, said receiving system having a directional antenna and means for causing said antenna to scan in elevation and azimuth in a predetermined pattern, said monopulse receiving system having sum and difference mixers in the respective associated channels, the outputs of said mixers being at said predetermined transmitter separation frequencies, said monopulse receiving system further having azimuth and elevation phase sensitive detectors for each of said separation frequencies for detecting the phase relationship between the sum and difference channel outputs,
   whereby the outputs of said azimuth and elevation detectors for each separation frequency reverse polarity when said antenna passes through the azimuth or elevation relative to the vehicle of a beacon transmitter contributing to the generation of said each separation frequency.

9. The system as recited in claim 8 wherein the ratio of the distances between the first and second of said transmitters and the second and third of said transmitters is approximately .15.

10. In a vehicle guidance system,
    a plurality of radio beacon transmitters located in a predetermined relative positional relationship, the transmission frequencies of said transmitters being separated from each other by predetermined separate frequencies,
    a monopulse receiving system mounted in said vehicle having sum and difference channels, said receiving system having a directional antenna and means for causing said antenna to scan in elevation and azimuth in a predetermined pattern and at a predetermined rate, said monopulse receiving system having sum and difference mixers in the respective associated channels, the outputs of said mixers being at said predetermined frequencies, said monopulse receiving system further having azimuth and elevation phase sensitive detectors for each of said predetermined frequencies for detecting the phase relationship between the sum and difference channel outputs, whereby the output of the azimuth and elevation detector for a predetermined frequency reverses polarity when said antenna passes through the azimuth or elevation respectively relative to the vehicle of each of the beacon transmitters contributing to the production of the associated one of said predetermined frequencies, and signal processor means mounted in said vehicle connected to receive the outputs of said phase sensitive detectors for generating D.-C. outputs in accordance with the range to one of said transmitters and vehicle azimuth and elevation steering information.

11. The system as recited in claim 10 wherein said signal processor means includes means for generating square waves of a predetermined amplitude having widths in accordance with the separation in time between polarity reversals of said phase sensitive detector outputs, and means for integrating said square waves to produce D.-C. outputs of an amplitude in accordance with the widths of said square waves.

12. In a vehicle guidance system, at least three beacon transmitters located in a predetermined positional relationship to each other, the transmission frequencies of said beacon transmitters being separated from each other by predetermined separate frequencies, direction sensing means mounted in said vehicle tuned to receive the outputs of said beacon transmitters, said direction sensing means including an antenna, means for causing said antenna to scan in azimuth and elevation in a predetermined pattern and at a predetermined rate, means connected to said antenna for detecting signals received at said predetermined separation frequencies, and azimuth phase sensitive means and elevation phase sensitive means for each of said predetermined frequencies connected to said detecting means, whereby the output of one of said azimuth phase sensitive means changes polarity when said antenna passes through the bearing of one of said beacon transmitters in azimuth and the output of one of said elevation phase sensitive means changes polarity when said antenna passes through the position of one of said beacon transmitters in elevation, and signal processor means connected to receive the outputs of said direction sensing means for generating signals in accordance with range to one of said transmitters and vehicle azimuth and elevation steering information.

13. The system as recited in claim 12 where said signal processor means includes means for generating square waves having a predetermined amplitude and having pulse widths in accordance with the portion of the antenna scan cycle during which the outputs of said phase sensitive means have a predetermined polarity, means for combining said square waves in a predetermined manner and means for integrating said combinations of said square waves.

14. In an aircraft landing system, at least three beacon transmitters located on an aircraft runway in a predetermined positional relationship to each other, the transmission frequencies of said beacon transmitters being separated from each other by predetermined separate frequencies, direction sensing means mounted in said aircraft tuned to receive the outputs of said beacon transmitters, said direction sensing means including an antenna, means for causing said antenna to scan in azimuth and elevation in a predetermined pattern and at a predetermined rate, means connected to said antenna for detecting signals received at said predetermined separation frequencies, and azimuth phase sensitive means and elevation phase sensitive means for each of said predetermined separation frequencies connected to said detecting means, whereby the output of one of said azimuth phase sensitive means changes polarity when said antenna passes through the bearing of one of said beacon transmitters in azimuth and the output of one of said elevation phase sensitive means changes polarity when said antenna passes through the position of one of said beacon transmitters in elevation, and signal processor means connected to receive the outputs of said direction sensing means for generating signals in accordance with range to one of said transmitters and aircraft azimuth and elevation steering information for effecting a landing, said signal processor means including means for selecting a desired glide slope angle, means for generating a signal in accordance with actual glide slope angle of the aircraft, and means for generating an elevation steering signal in accordance with the difference between the desired glide slope angle and the actual glide slope angle.

15. The landing system as recited in claim 14 wherein said signal processor means comprises means for generating fixed amplitude square waves having pulse widths in accordance with the time period during which the outputs of said phase sensitive means have a predetermined polarity, means for combining said square waves in a predetermined manner, and means for integrating said combinations of square waves.

16. A system for providing information for the guidance of a vehicle comprising at least three radio beacon transmitters spaced from each other in a predetermined positional relationship, the transmission frequencies of said beacon transmitters being separated from each other by predetermined separate frequencies, radio direction finding means mounted in said vehicle for generating output signals in accordance with the angles subtended at the vehicle between at least two pairs of said beacon transmitters, said direction finding means including antenna means having at least a pair of lobes separated in azimuth and squinted in elevation, means for driving said antenna in azimuth and elevation at a predetermined scan rate and in a predetermined pattern, means connected to receive the output of said antenna for detecting at least two of said predetermined separation frequencies, and phase sensitive means for azimuth and elevation connected to said detecting means for each of said two predetermined separation frequencies for generating a signal of one polarity during the period when the center of said antenna lobes is between one pair of said beacon transmitters in azimuth and elevation respectively and of an opposite polarity when the center of said antenna lobes is between another pair of said beacon transmitters in azimuth and elevation respectively, and means responsively connected to said phase sensitive means for generating signals in accordance with range to one of said beacon transmitters, and vehicle elevation and azimuth steering information.

17. The system as recited in claim 16 wherein said means for generating signals in accordance with range and vehicle elevation and azimuth steering includes means for generating square waves of a fixed amplitude and having widths in accordance with the duration of the periods when said phase sensitive means outputs are of a predetermined polarity, means for combining said square waves in a predetermined manner and means for integrating the combinations of square waves to produce D.-C. outputs.

18. A system for providing information for landing an aircraft comprising
at least three radio beacon transmitters spaced from each other in a predetermined positional relationship on an aircraft runway, the transmission frequencies of said beacon transmitters being separated from each other by predetermined separate frequencies,
radio direction finding means mounted in said vehicle for generating output signals in accordance with the angles subtended at the vehicle between at least two pairs of said beacon transmitters, said direction finding means including antenna means having at least a pair of lobes separated in azimuth and squinted in elevation, means for driving said antenna in azimuth and elevation at a predetermined scan rate and in a predetermined pattern, means connected to receive the output of said antenna for detecting at least two of said predetermined separation frequencies, and phase sensitive means for azimuth and elevation connected to said detecting means for each of said predetermined separation frequencies for generating a signal of one polarity during the period when the center of said antenna lobes is between one pair of said beacon transmitters in azimuth and elevation respectively and of an opposite polarity when the center of said antenna lobes is between another pair of said beacon transmitters in azimuth and elevation respectively, and
signal processor means connnected to receive the outputs of said phase sensitive means for generating steering signals for landing said aircraft at a predetermined touchdown point, said signal processor means including means for selecting a desired glide slope angle, means for determining the aircraft's actual glide slope angle and means for generating an elevation correction signal in accordance with the difference between desired and actual glide slope angle.

19. A system for providing information for the guidance of a vehicle comprising
at least three radio beacon transmitters spaced from each other in a predetermined relative positional relationship, the transmission frequencies of said beacons being separated from each other by predetermined separate frequencies,
radio direction finding means mounted in said vehicle for generating output signals in accordance with the angles subtended at said vehicle between at least two pairs of said beacon transmitters, said direction finding means including an antenna having at least two receiving elements, means for driving said antenna in azimuth and elevation at a predetermined rate and in a predetermined pattern, means for providing the sum and the difference of the signals received at said elements in separate channels, separate mixer means in each of said channels for generating beat frequency output signals at said predetermined separation frequencies, and separate phase detector means tuned to detect each of the separation frequency azimuth and elevation components for generating output signals having polarities indicative of the phase relationships between the signals at said predetermined frequencies in said difference and sum channels, each of said phase detectors being connected to one of said channels to receive one of said azimuth and elevation components at one of said predetermined frequencies and a signal from said sum channel at one of said frequencies, and
separate gating means responsively connected to the outputs of each of said phase detectors for generating a substantially square wave signal having a width in accordance with the magnitude of the portion of the antenna scan cycle during which the associated phase detector output has a predetermined polarity.

References Cited in the file of this patent
UNITED STATES PATENTS

| | | |
|---|---|---|
| 2,226,860 | Greig | Dec. 31, 1940 |
| 2,451,823 | Guanella | Oct. 19, 1948 |
| 3,014,214 | Ashby et al. | Dec. 19, 1961 |